UNITED STATES PATENT OFFICE.

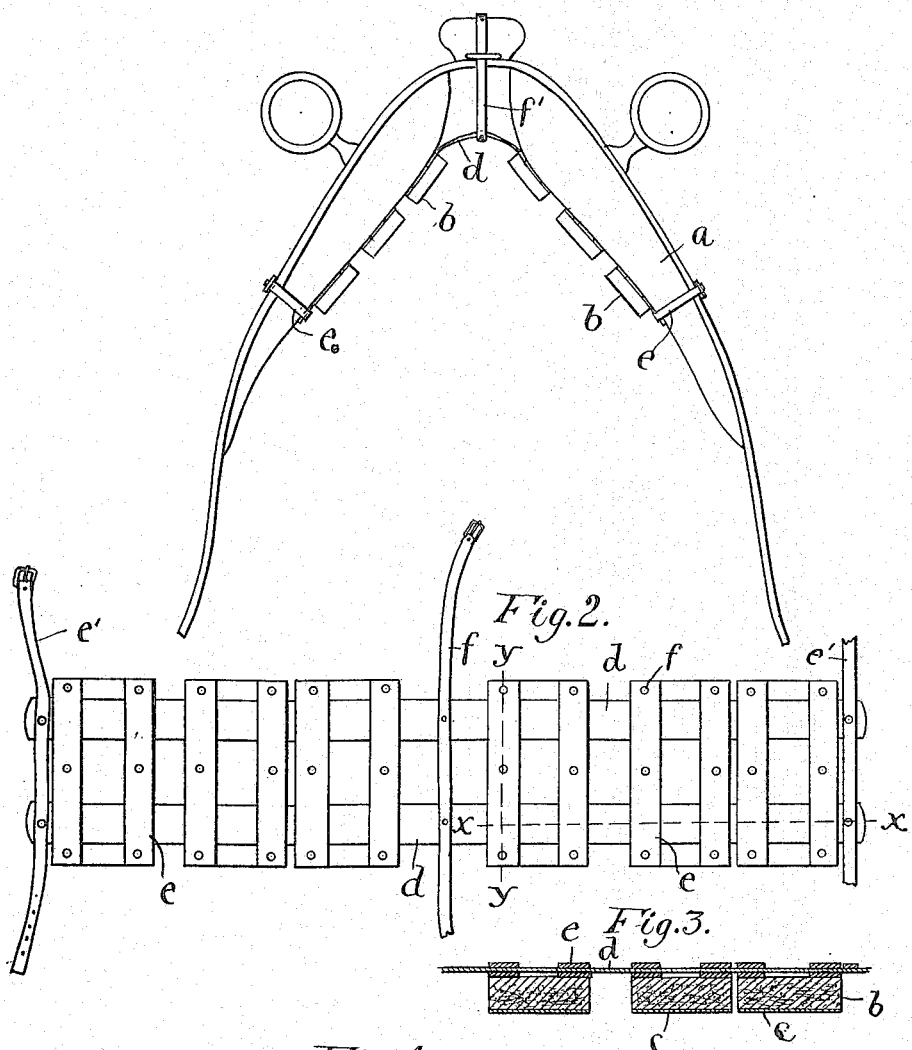

DANIEL H. CARRIGAN, OF PORTLAND, MAINE.

HARNESS-PAD.

1,129,847. Specification of Letters Patent. Patented Mar. 2, 1915.

Application filed November 5, 1913. Serial No. 799,380.

*To all whom it may concern:*

Be it known that I, DANIEL H. CARRIGAN, of Portland, in the county of Cumberland and State of Maine, have invented certain new and useful Improvements in Harness-Pads, of which the following is a specification.

My invention relates to a harness pad such as is used to protect the back of a horse from the chafing of the saddle. Sores are often produced on the back of a horse by the chafing of the saddle and the object of my invention is to construct a pad which will equalize the bearing surface of the saddle and at the same time be capable of ready adjustment whereby an open space may be left which will avoid contact with the sore. This object is accomplished by means of the harness pad hereinafter shown and claimed.

My invention is best understood by means of the accompanying drawing, in which—

Figure 1 is a part elevation of a saddle having one of my harness pads secured thereto, Fig. 2 is a plan of the pad in extended position, Fig. 3 is a section on the line $x\ x$ of Fig. 2, and Fig. 4 is a section on the line $y\ y$ of Fig. 2.

In the drawing $a$ represents a harness saddle which may be the saddle of a working harness such as is used with draft horses.

My pad is made up of pad sections $b$ adapted to be interposed between the saddle and the horse's back. The pad sections as here shown are rectangular pieces of thick felt and they are preferably faced with pieces $c$ of closely woven fabric cemented to the under surface with waterproof cement making a moisture proof surface which comes next to the horse's back.

The individual pad sections are held in such a way that they may be freely slipped into any desired position with relation to each other, being retained in position by friction. The sections are held together by means of a pair of longitudinal straps $d$ extending parallel with each other across the backs of all the pads. The straps $d$ are connected with the pad sections by means of transverse straps $e$ on each pad one on each edge and extending the entire length of the pad section. The transverse straps are preferably doubled and they are riveted to the pad sections by rivets $f$ forming two loops or openings between the under and upper portions of the strap through which pass the straps $d$. The straps are preferably made of course webbing and the loops through which the straps $d$ pass are a sufficiently close fit so that the pad sections will slide with some difficulty on the straps $d$. The pad sections will thus be held in place by friction and will remain in place under ordinary circumstances.

Means are provided for fastening the pad to the harness and as here shown I secure two buckle straps $e'$ one at each end of the pad with a third buckle strap $f'$ at the center. These straps are buckled around the saddle at the center and near the lower ends and serve to hold the pad firmly in place.

In using my pad the pad sections are evenly distributed along the whole length of the pad under ordinary circumstances but when a sore place forms on the horse's back the sections are adjusted so as to bear on each side of the sore, leaving an open place which does not touch the sore. Since the sections are held by friction they may be very quickly and accurately adjusted and when once adjusted they will stay in place under normal circumstances until intentionally removed.

I claim;—

A harness pad including a pair of flexible straps extending longitudinally of the pad, a series of transversely arranged pad sections, and straps secured to the backs of said pad sections to form closely fitting loops through which the longitudinal straps pass, said pad sections being arranged to leave intervening spaces and being frictionally held and slidable on said longitudinal straps.

In testimony whereof I have affixed my signature, in presence of two witnesses.

DANIEL H. CARRIGAN.

Witnesses:
S. W. BATES,
C. B. CREIGHTON.

Copies of this patent may be obtained for five cents each, by addressing the "Commissioner of Patents, Washington, D. C."